(12) United States Patent
Samuel et al.

(10) Patent No.: US 12,001,302 B2
(45) Date of Patent: Jun. 4, 2024

(54) SYSTEMS AND METHODS FOR MEMORY SERVICEABILITY MITIGATION

(71) Applicant: Dell Products, L.P., Round Rock, TX (US)

(72) Inventors: Balasingh Ponraj Samuel, Round Rock, TX (US); Michael Wayne Arms, Copperas Cove, TX (US); Vivek Viswanathan Iyer, Saint Johns, FL (US)

(73) Assignee: Dell Products, L.P., Round Rock, TX (US)

( * ) Notice: Subject to any disclaimer, the term of this patent is extended or adjusted under 35 U.S.C. 154(b) by 0 days.

(21) Appl. No.: 17/930,346

(22) Filed: Sep. 7, 2022

(65) Prior Publication Data

US 2024/0078158 A1   Mar. 7, 2024

(51) Int. Cl.
*G06F 11/16* (2006.01)
*G06F 11/20* (2006.01)

(52) U.S. Cl.
CPC ........ *G06F 11/167* (2013.01); *G06F 11/1662* (2013.01); *G06F 11/2048* (2013.01)

(58) Field of Classification Search
CPC .... G06F 11/16; G06F 11/167; G06F 11/1662; G06F 11/20; G06F 11/2048
See application file for complete search history.

(56) References Cited

U.S. PATENT DOCUMENTS

| | | | | |
|---|---|---|---|---|
| 6,467,054 | B1* | 10/2002 | Lenny | H04L 9/40 369/53.17 |
| 11,269,729 | B1* | 3/2022 | Bulusu | G06F 11/0778 |
| 11,347,856 | B2* | 5/2022 | Sayyed | G06F 21/577 |
| 2010/0293410 | A1* | 11/2010 | Bland | G11C 29/88 714/6.13 |
| 2013/0326263 | A1* | 12/2013 | Alameldeen | G06F 11/2205 714/6.2 |
| 2014/0304566 | A1* | 10/2014 | Henderson | G06F 1/3275 714/764 |
| 2019/0188092 | A1* | 6/2019 | Prasad | G06F 11/1402 |
| 2021/0225159 | A1* | 7/2021 | Grobelny | G08B 29/16 |

* cited by examiner

*Primary Examiner* — Kamini B Patel
(74) *Attorney, Agent, or Firm* — Fogarty LLP

(57) ABSTRACT

Systems and methods for memory serviceability mitigation are described. In some embodiments, an Information Handling System (IHS) may include a processor and a memory coupled to the processor, the memory having program instructions stored thereon that, upon execution, cause the IHS to: after failure of a memory device, notify a cloud service and enter a mitigation mode of operation with respect to the memory device, receive a message from the cloud service indicative of the provisioning of a replacement memory device, and, in response to the message and upon detection of a chassis intrusion event, leave the mitigation mode of operation with respect to the replacement memory device.

20 Claims, 9 Drawing Sheets

SYSTEMS AND METHODS FOR MEMORY SERVICEABILITY MITIGATION

FIELD

This disclosure relates generally to Information Handling Systems (IHSs), and more specifically, to systems and methods for memory serviceability mitigation.

BACKGROUND

As the value and use of information continues to increase, individuals and businesses seek additional ways to process and store it. One option available to users is an Information Handling System (IHS). An IHS generally processes, compiles, stores, and/or communicates information or data for business, personal, or other purposes thereby allowing users to take advantage of the value of the information. Because technology and information handling needs and requirements vary between different users or applications, IHSs may also vary regarding what information is handled, how the information is handled, how much information is processed, stored, or communicated, and how quickly and efficiently the information may be processed, stored, or communicated.

Variations in IHSs allow for IHSs to be general or configured for a specific user or specific use such as financial transaction processing, airline reservations, enterprise data storage, or global communications. In addition, IHSs may include a variety of hardware and software components that may be configured to process, store, and communicate information and may include one or more computer systems, data storage systems, and networking systems.

Today, when an IHS suffers a memory failure (e.g., due to connector corrosion, etc.), the IHS can automatically mitigate the failure (e.g., by disabling a defective channel) and continue its booting process with reduced memory capabilities.

SUMMARY

Systems and methods for memory serviceability mitigation are described. In an illustrative, non-limiting embodiment, an Information Handling System (IHS) may include a processor and a memory coupled to the processor, the memory having program instructions stored thereon that, upon execution, cause the IHS to: after failure of a memory device, notify a cloud service and enter a mitigation mode of operation with respect to the memory device, receive a message from the cloud service indicative of the provisioning of a replacement memory device, and, in response to the message and upon detection of a chassis intrusion event, leave the mitigation mode of operation with respect to the replacement memory device.

The failure may include a memory initialization failure during a booting process. The program instructions may include Basic Input/Output System (BIOS) instructions. The memory device may include a Dual In-Line Memory Module (DIMM), and to enter the mitigation mode of operation, the program instructions, upon execution, may cause the IHS to disable at least a portion of a DIMM slot where the memory device is inserted.

Additionally, or alternatively, to enter the mitigation mode of operation, the program instructions, upon execution, may cause the IHS to disable fewer than all memory channels of the memory device. Additionally, or alternatively, to enter the mitigation mode of operation, the program instructions, upon execution, may cause the IHS to set a mitigation flag in a Non-Volatile Random Access Memory (NVRAM).

While in the mitigation mode of operation, the program instructions, upon execution, may cause the IHS to check a status of the mitigation flag upon boot and, if the mitigation flag is set, maintain at least portion of the memory device disabled.

The message may be indicative of at least one of: a warranty claim, a service agreement, a purchase, a shipment, or a delivery of the replacement memory device. Moreover, the chassis intrusion event may be detectable via activation of an electromechanical switch or photosensor disposed within a housing of the IHS.

To leave the mitigation mode of operation, the program instructions, upon execution, may cause the IHS to initialize or enable at least a portion of the replacement memory device corresponding to at least a portion of the memory device disabled during the mitigation mode of operation. Additionally, or alternatively, to leave the mitigation mode of operation, the program instructions, upon execution, may cause the IHS to initialize or enable at least a portion of the replacement memory device corresponding to at least a portion of the memory device disabled during the mitigation mode of operation. Additionally, or alternatively, to leave the mitigation mode of operation, the program instructions, upon execution, may cause the IHS to clear a mitigation flag in an NVRAM in response to a successful initialization of the replacement memory module.

The message may include an indication of a time before which, in the presence of the chassis intrusion event, the IHS is configured to abstain from leaving the mitigation mode of operation. Additionally, or alternatively, the message may include an indication of a time at, after, or during which, in the absence of the chassis intrusion event, the IHS is configured to prompt a user to replace the memory device with the replacement memory device, and wherein the chassis intrusion event takes place in response to the prompt.

In another illustrative, non-limiting embodiment, a memory device may have program instructions stored thereon that, upon execution by a process of an IHS, cause the IHS to: receive a notification from a client IHS indicating that the client IHS has entered a mitigation mode of operation with respect to a memory device, and transmit a message to the client IHS related to a replacement memory device, wherein the client IHS is configured to, in response to the message and upon detection of a chassis intrusion event, leave the mitigation mode of operation with respect to the replacement memory device.

The message may include an indication of a time at, after, or during which, in the presence of the chassis intrusion event, the IHS is configured to leave the mitigation mode of operation. Also, to transmit the message, the IHS may be configured to perform a warranty or service status check with respect to the client IHS.

In another illustrative, non-limiting embodiment, a method may include entering, upon execution of BIOS instructions, a mitigation mode of operation with respect to a memory device of an IHS, and, in response to a message from a cloud service and upon detection of a chassis intrusion event, leaving the mitigation mode of operation with respect to a replacement memory device.

The message may include an indication of a time before which, in the presence of the chassis intrusion event, the IHS is configured to abstain from leaving the mitigation mode of operation. Additionally, or alternatively, the message may include an indication of a time at, after, or during which, in the absence of the chassis intrusion event, the IHS is configured to prompt a user to replace the memory device with the replacement memory device, and wherein the chassis intrusion event takes place in response to the prompt.

BRIEF DESCRIPTION OF THE DRAWINGS

The present invention(s) is/are illustrated by way of example and is/are not limited by the accompanying figures, in which like references indicate similar elements. Elements in the figures are illustrated for simplicity and clarity, and have not necessarily been drawn to scale.

DETAILED DESCRIPTION

For purposes of this disclosure, an Information Handling System (IHS) may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an IHS may be a personal computer (e.g., desktop or laptop), tablet computer, mobile device (e.g., Personal Digital Assistant (PDA) or smart phone), server (e.g., blade server or rack server), a network storage device, or any other suitable device and may vary in size, shape, performance, functionality, and price.

An IHS may include Random Access Memory (RAM), one or more processing resources such as a Central Processing Unit (CPU) or hardware or software control logic, Read-Only Memory (ROM), and/or other types of nonvolatile memory. Additional components of an IHS may include one or more disk drives, one or more network ports for communicating with external devices as well as various I/O devices, such as a keyboard, a mouse, touchscreen, and/or a video display. An IHS may also include one or more buses operable to transmit communications between the various hardware components.

Figure 1:
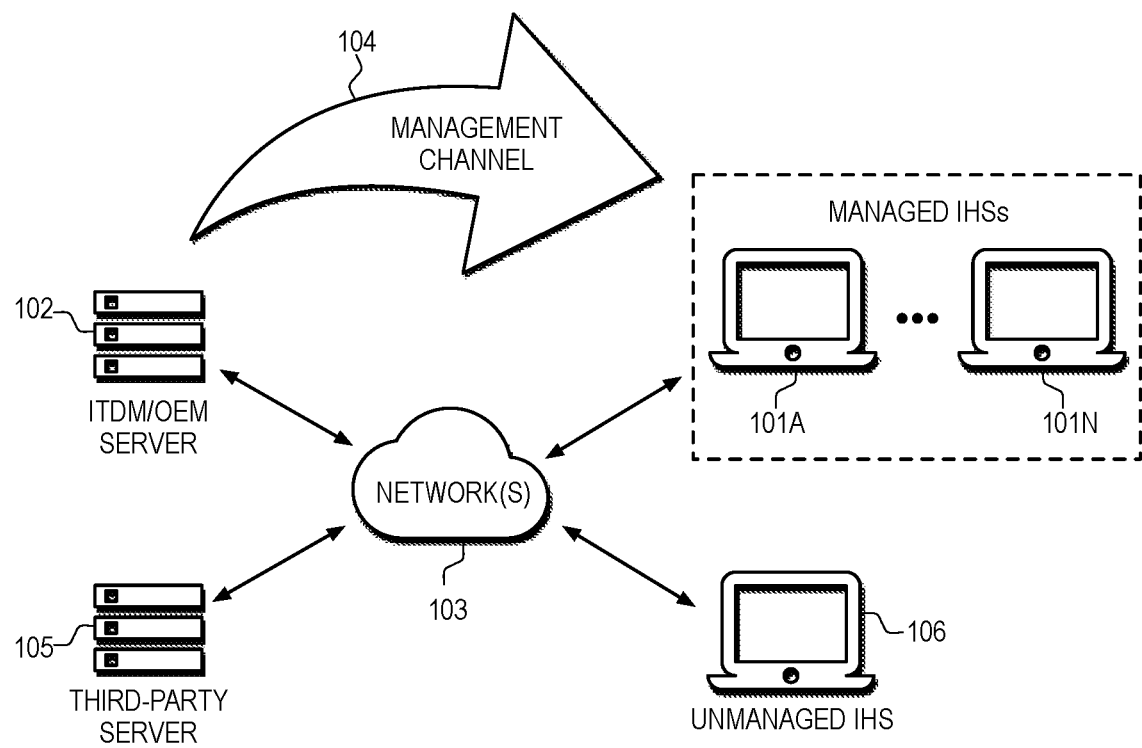
FIG. 1 is a block diagram illustrating an example of an environment where systems and methods described herein may be implemented, according to some embodiments.

FIG. 1 is a diagram illustrating an example of environment 100 where systems and methods described herein may be implemented. In various embodiments, IHSs 101A-N may be accessible to Information Technology (IT) Decision Maker (ITDM) or Original Equipment Manufacturer (OEM) server 102 over network 103 (e.g., the Internet, an intranet, etc.) via management channel 104. As described in more detail below, one or more of IHSs 101A-N may be managed by ITDM/OEM server 102 over management channel 104.

ITDM/OEM server 102 may be located on premises along with one or more managed IHSs 101A-N, or it may be remotely located with respect to managed IHSs 101A-N. For example, one or more of managed IHSs 101A-N may be deployed within an enterprise, business, or corporation having an ITDM in charge of managing usage, operation, configuration, and other aspects of managed IHSs 101A-N. Particularly, an ITDM may use one or more management tools executed by ITDM/OEM server 102 to establish management channel 104 with managed IHSs 101A-N. Examples of management tools may include, but are not limited to, WINDOWS Admin Center, MICROSOFT Endpoint Configuration Manager, System Center Configuration Manager (SCCM), AZURE, INTUNE, VMWARE WORKSPACE ONE, etc.

ITDM/OEM server 102 may be coupled to an ITDM or OEM database. Such a database may include, for example: an identification of managed IHSs 101A-N(e.g., by service tag, serial number, etc.), an inventory of IHS components installed in managed IHSs 101A-N (e.g., components integrated into managed IHSs 101A-N, peripheral devices coupled to managed IHSs 101A-N, etc.), an identification of a heterogenous computing platform 300 installed in managed IHSs 101A-N, a list of authorized users, usernames, passwords, logon credentials, cryptographic keys, digital certificates, Operating System (OS) installation or update packages, software application installation or update packages, firmware installation or update packages, hardware policies, software policies, telemetry collected from managed IHSs 101A-N, customer/client support information, etc.

In some cases, one or more management operations performed by ITDM/OEM server 102 via management channel 104 may be selected or modified, at least in part, based upon information stored in an ITDM or OEM database. For example, a different firmware installation package containing a base driver and/or one or more extension drivers (sometimes referred to as information or "INF" drivers) may be selected, assembled, and/or delivered to each given one of managed IHSs 101A-N specifically for the IHSs' components 200 (FIG. 2).

The term "firmware," as used herein, refers to a class of program instructions that provides low-level control for a device's hardware. Generally, firmware enables basic functions of a device and/or provides hardware abstraction services to higher-level software, such as an OS. The term "firmware installation package," as used herein, refers to program instructions that, upon execution, deploy device drivers or services in an IHS or IHS component.

Still referring to environment 100, any of managed IHSs 101A-N may be in communication with any other one of managed IHSs 101A-N and/or with another, third-party IHS 106, which is not necessarily managed by ITDM/OEM server 102, over network(s) 103. Additionally, or alternatively, any of managed IHSs 101A-N may receive services (e.g., cloud or remote services) from third-party server 105. In some cases, interactions between managed IHSs 101A-N and/or third-party IHS 106 may be supported, at least in part, by third-party server 105.

Figure 2:
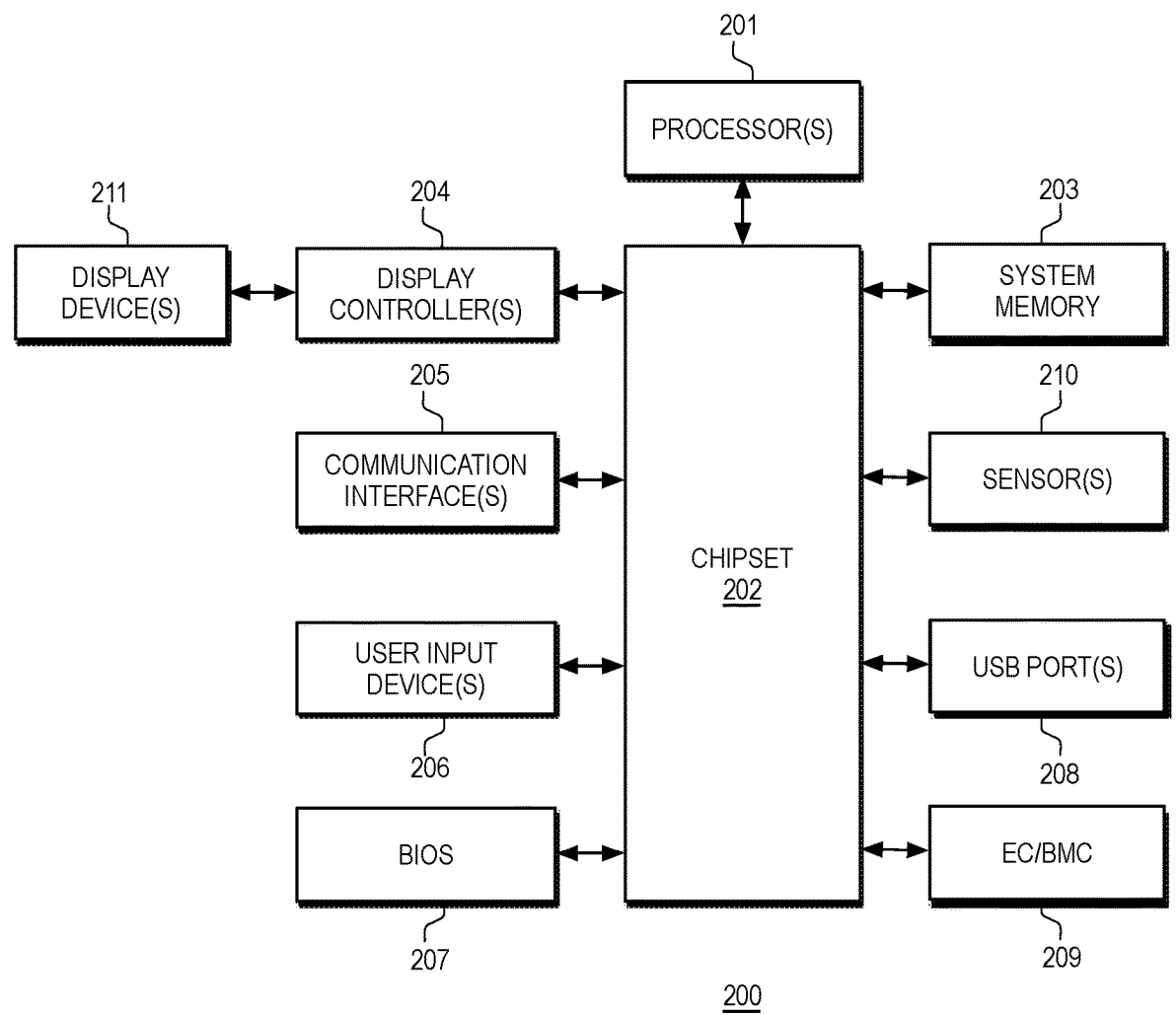
FIG. 2 is a block diagram illustrating examples of components of an Information Handling System (IHS), according to some embodiments.

FIG. 2 is a block diagram of components of IHS 200, which may be used to implement any of managed IHSs 101A-N, ITDM/OEM server 102, third-party server 105 and/or third-party IHS 106, in FIG. 1. As depicted, IHS 200 includes processor(s) 201. In various embodiments, IHS 200 may be a single-processor system, or a multi-processor system including two or more processors. Processor(s) 201 may include any processor capable of executing program instructions, such as a PENTIUM processor, or any general-purpose or embedded processors implementing any of a variety of Instruction Set Architectures (ISAs), such as an x86 ISA or a Reduced Instruction Set Computer (RISC) ISA (e.g., POWERPC, ARM, SPARC, MIPS, etc.).

IHS 200 includes chipset 202 coupled to processor(s) 201. Chipset 202 may provide processor 201 with access to several resources. In some cases, chipset 202 may utilize a QuickPath Interconnect (QPI) bus to communicate with processor(s) 201. Chipset 202 may also be coupled to communication interface(s) 205 to enable communications between IHS 200 and various wired and/or wireless networks, such as Ethernet, WiFi, BT, cellular or mobile networks (e.g., Code-Division Multiple Access or "CDMA," Time-Division Multiple Access or "TDMA," Long-Term Evolution or "LTE," etc.), satellite networks, or the like. In some cases, communication interface(s) 205 may be used to communicate with devices (e.g., BT speakers, microphones, headsets, etc.). Moreover, communication interface(s) 205 may be coupled to chipset 202 via a Peripheral Component Interconnect Express (PCIe) bus or the like.

Chipset 202 may be coupled to display and/or touchscreen controller(s) 204, which may include one or more Graphics Processor Units (GPUs) on a graphics bus, such as an Accelerated Graphics Port (AGP) or PCIe bus. As shown, display controller(s) 204 provide video or display signals to one or more display device(s) 211.

Display device(s) 211 may include Liquid Crystal Display (LCD), Light Emitting Diode (LED), organic LED (OLED), or other thin film display technologies. Display device(s) 211 may include a plurality of pixels arranged in a matrix, configured to display visual information, such as text, two-dimensional images, video, three-dimensional images, etc. In some cases, display device(s) 211 may be provided as a single continuous display, rather than two discrete displays.

Chipset 202 may provide processor(s) 201 and/or display controller(s) 204 with access to system memory 203. In various embodiments, system memory 203 may be implemented using any suitable memory technology, such as static RAM (SRAM), dynamic RAM (DRAM) or magnetic disks, or any nonvolatile/Flash-type memory, such as a solid-state drive (SSD), NVRAM, or the like. System memory 203 may store program instructions that, upon execution by processor(s) 201, enable a collaboration mode for a touchpad coupled to or integrated into IHS 200.

In various implementations, memory 203 may include one or more discrete memory devices such as, for example, Dual In-Line Memory Modules (DIMMs) or "RAM sticks." Each DIMM may be coupled to IHS 200 via one or more slots on a Printed Circuit Board (PCB) or motherboard. DIMMs come in a variety of speeds and sizes but are generally designed for either desktop IHSs or laptop IHSs ("SO-DIMMs").

In many cases, a single DIMM may include a plurality of memory channels, each channel comprising a distinct set of electrical terminals. Each channel may be individually enumerated by BIOS 207 during boot and independently accessible by OS 303.

In certain embodiments, chipset 202 may also provide access to one or more Universal Serial Bus (USB) ports 208, to which one or more peripheral devices may be coupled (e.g., integrated or external webcams, microphones, speakers, etc.). Chipset 202 may provide access to one or more hard disk drives, solid-state drives, optical drives, or other removable-media drives.

Chipset 202 may further provide access to one or more user input devices 206, for example, using a super I/O controller or the like. Examples of user input devices 206 include, but are not limited to, a keyboard, mouse, touchpad, stylus or active pen, totem, etc. Each of user input devices 206 may include a respective controller (e.g., a touchpad may have its own touchpad controller) that interfaces with chipset 202 through a wired or wireless connection (e.g., via communication interfaces(s) 205).

In certain embodiments, chipset 202 may also provide an interface for communications with one or more hardware sensors 210. Sensors 210 may be disposed on or within the chassis of IHS 200, or otherwise coupled to IHS 200, and may include, but are not limited to: electric, magnetic, radio, optical (e.g., camera, webcam, etc.), infrared, thermal, force, pressure, acoustic (e.g., microphone), ultrasonic, proximity, position, deformation, bending, direction, movement, velocity, rotation, gyroscope, Inertial Measurement Unit (IMU), and/or acceleration sensor(s). In some cases, sensors 210 may also include an electromechanical switch, photosensor, or the like, configured to detect chassis intrusion events (e.g., unauthorized accesses into the interior of the housing of IHS 200).

Upon booting of IHS 200, processor(s) 201 may utilize program instructions of Basic Input/Output System (BIOS) 207 to initialize and test hardware components coupled to IHS 200 and to load an OS for use by IHS 200. BIOS 207 provides an abstraction layer that allows the OS to interface with certain hardware components that are utilized by IHS 200. Via the hardware abstraction layer provided by BIOS 207, software stored in system memory 203 and executed by processor(s) 201 can interface with certain I/O devices that are coupled to IHS 200.

The Unified Extensible Firmware Interface (UEFI) was designed as a successor to BIOS. As a result, many modern IHSs utilize UEFI in addition to or instead of a BIOS. As used herein, BIOS 207 is intended to also encompass a UEFI component.

Embedded Controller (EC) or Baseboard Management Controller (BMC) 209 is operational from the very start of each IHS power reset and it handles various tasks not ordinarily handled by processor(s) 201. Examples of these operations may include, but are not limited to: receiving and processing signals from a keyboard or touchpad, as well as other buttons and switches (e.g., power button, laptop lid switch, etc.), receiving and processing thermal measurements (e.g., performing fan control, CPU and GPU throttling, and emergency shutdown), controlling indicator LEDs (e.g., caps lock, scroll lock, num lock, battery, ac, power, wireless LAN, sleep, etc.), managing the battery charger and the battery, allowing remote diagnostics and remediation over network(s) 103, detecting chassis intrusion events (e.g., using one or more of sensors 210), etc.

For example, EC/BMC 209 may implement operations for interfacing with a power adapter in managing power for IHS 200. Such operations may be utilized to determine the power status of IHS 200, such as whether IHS 200 is operating from battery power or is plugged into an AC power source. Firmware instructions utilized by EC/BMC 209 may be used to provide various core operations of IHS 200, such as power management and management of certain modes of IHS 200 (e.g., turbo modes, maximum operating clock frequencies of certain components, etc.).

EC/BMC 209 may also implement operations for detecting certain changes to the physical configuration or posture of IHS 200 and managing other devices in different configurations of IHS 200. For instance, when IHS 200 as a 2-in-1 laptop/tablet form factor, EC/BMC 209 may receive inputs from a lid position or hinge angle sensor 210, and it may use those inputs to determine: whether the two sides of IHS 200 have been latched together to a closed position or a tablet position, the magnitude of a hinge or lid angle, etc. In response to these changes, the EC may enable or disable certain features of IHS 200 (e.g., front or rear facing camera, etc.).

In some cases, EC/BMC 209 may be configured to identify any number of IHS postures, including, but not limited to: laptop, tablet, or book. For example, when display(s) 211 of IHS 200 is open with respect to a horizontal keyboard portion, EC/BMC 209 may determine IHS 200 to be in a laptop posture. When the back of display(s) 211 is closed against the back of the keyboard portion, EC/BMC 209 may determine IHS 200 to be in a tablet posture. When IHS 200 has two display(s) 211 open side-by-side, EC/BMC 209 may determine IHS 200 to be in book posture. In some implementations, EC/BMC 209 may also determine if a display of IHS 200 is in a landscape or portrait orientation.

In some cases, EC/BMC 209 may be installed as a Trusted Execution Environment (TEE) component to the motherboard of IHS 200. Additionally, or alternatively, EC/BMC 209 may be further configured to calculate hashes or signatures that uniquely identify individual components of IHS 200. In such scenarios, EC/BMC 209 may calculate a hash value based on the configuration of a hardware and/or software component coupled to IHS 200. For instance, EC/BMC 209 may calculate a hash value based on all firmware and other code or settings stored in an onboard memory of a hardware component.

Hash values may be calculated as part of a trusted process of manufacturing IHS 200 and may be maintained in secure storage as a reference signature. EC/BMC 209 may later recalculate the hash value for a component may compare it against the reference hash value to determine if any modifications have been made to the component, thus indicating that the component has been compromised. In this manner, EC/BMC 209 may validate the integrity of hardware and software components installed in IHS 200.

In other embodiments, IHS 200 may not include all the components shown in FIG. 1. In other embodiments, IHS 200 may include other components in addition to those that are shown in FIG. 1. Furthermore, some components that are represented as separate components in FIG. 1 may instead be integrated with other components, such that all or a portion of the operations executed by the illustrated components may instead be executed by the integrated component.

For example, in various embodiments described herein, processor(s) 201 and/or other components shown in FIG. 2 (e.g., chipset 202, display controller(s) 204, communication interface(s) 205, EC/BMC 209, etc.) may be replaced by a heterogenous computing platform, or the like. As such, IHS 200 may assume different form factors including, but not limited to: servers, workstations, desktops, laptops, appliances, video game consoles, tablets, smartphones, etc.

Figure 3:
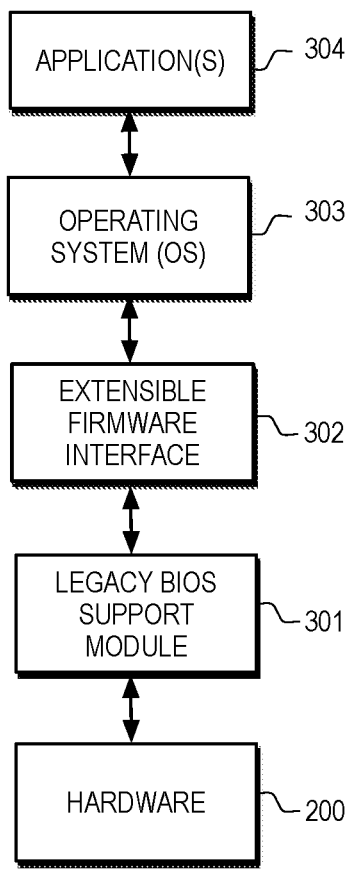
FIG. 3 is a block diagram illustrating aspects of software components executed by an IHS, according to some embodiments.

FIG. 3 is a diagram illustrating aspects of a software components 300 instantiated by IHS 200. As shown, hardware 200 is configured to execute legacy BIOS instructions to instantiate legacy BIOS support module 301, which supports EFI interface 302 upon which OS 303 may be executed. OS 303 is system software that manages computer hardware, software resources, and provides common services for computer programs or application(s) 304.

In various implementations, modules 301 and 302 may result from the execution, by processor(s) 201, of instructions stored in BIOS 207 (e.g., an NVRAM). OS 303 may include any suitable OS, such as: MICROSOFT WINDOWS, WINDOWS on ARM (WoA), macOS, iOS, chromeOS, LINUX, etc. and applications 304 may include any software application, client, or agent executable by OS 303.

Referring again to FIG. 2, the size of system memory 203 may be reduced when a memory channel is disabled by BIOS 207, for example, due to the detection of a failure during boot. When a failed memory or channel is excluded from its operation, IHS 200 may be said to have entered "mitigation mode." However, a reduced memory size can negatively impact the IHS's performance. Therefore, it is important to bring IHS 200 to its "normal mode" once the defective memory is replaced or repaired.

Unfortunately, system memory 203's firmware cannot detect DIMM change events when memory channels are disabled. Moreover, to promote overall efficiency and reduce boot times, system memory 203 does not re-enable a failed memory channel, detect the (same) failure again, and then re-enter mitigation mode, at every single boot. So, once an IHS enters mitigation mode, in order to eventually re-enable the entire system memory 203, a manual BIOS setup process is typically required.

Due to a lack of user notification or warning, however, the BIOS setup process for returning IHS 200 normal mode is often overlooked. As a result, IHS 200 can continue to be operated in mitigation mode—the topic of numerous support calls from users complaining reduced performance—even after the failed memory has been replaced.

In short, after having entered mitigation mode, a user must remember to use a BIOS setup to manually re-enable an IHS's normal operation. Otherwise, IHS 200 remains in mitigation mode indefinitely. To address these, and other concerns, systems and methods described herein provide memory serviceability mitigation.

As used herein, the terms "service call," "customer call," "support call," and similar terms are used to describe any form of remote communication (e.g., phone call, video conference, email, chat, text, instant message, etc.) between a user and a service center, customer center, support center, IT administration, help desk, OEM, retailer, or other entity in charge of servicing, maintaining, or supporting the operation IHS 200.

Figure 4:
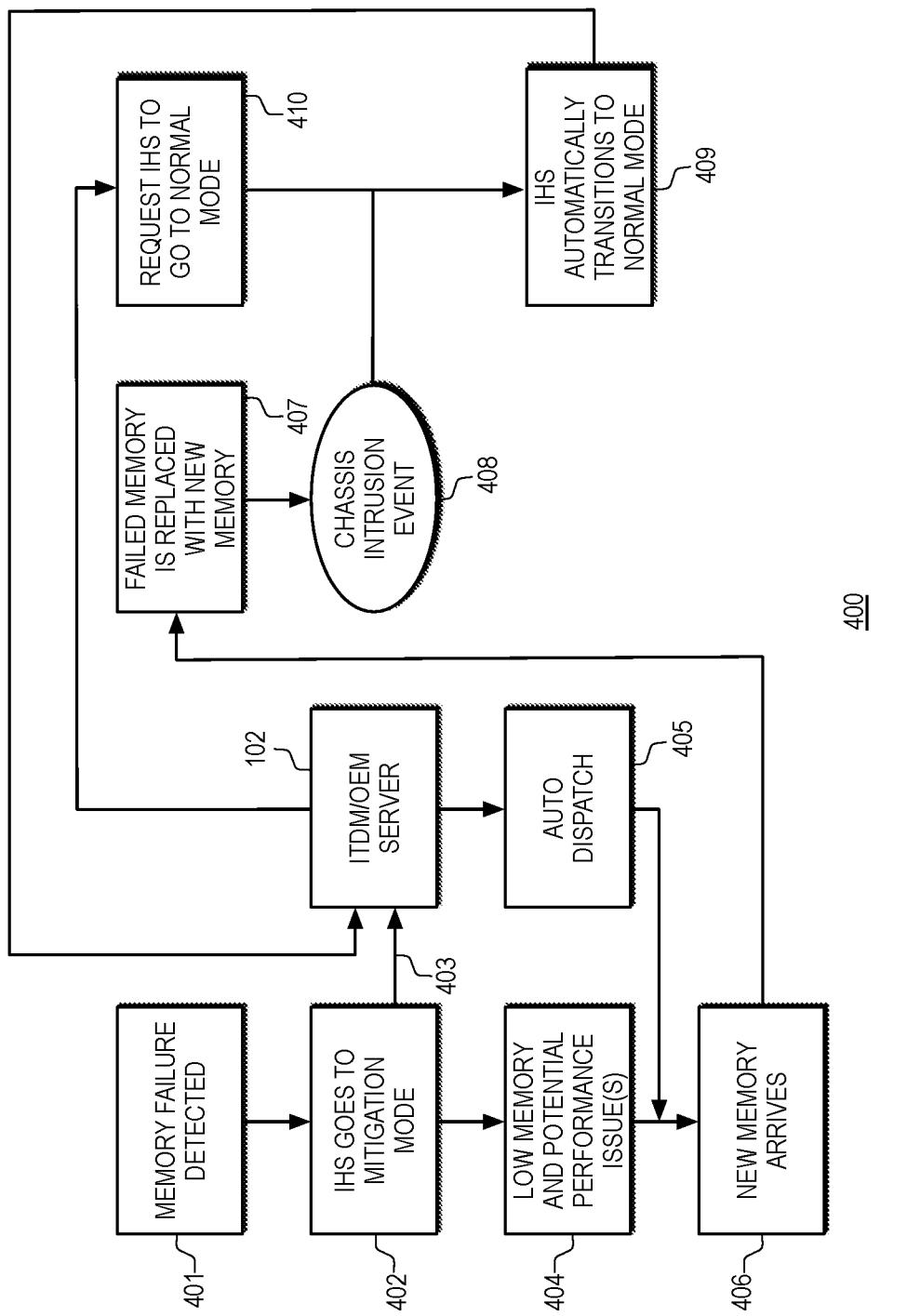
FIG. 4 is a flowchart illustrating an example of a method for memory serviceability mitigation, according to some embodiments.

FIG. 4 is a flowchart illustrating an example of 400 method for memory serviceability mitigation, according to some embodiments. Particularly, at 401, a memory failure is detected by BIOS 207 as part of a memory initialization process during booting of IHS 200. For example, a memory failure may take place due to physical damage, electrical failure, dust, corrosion, or other contamination on a DIMM's connector or circuits. In some cases, the failure may be deemed uncorrectable (e.g., the BIOS reports "A Hypertransport Sync Flood occurred on last boot") or correctable by software (e.g., if a DIMM has N or more correctable errors in T hours, it is considered defective and should be replaced).

At 402, BIOS 207 sets IHS 200 in mitigation mode, for example, by excluding or disabling one or more slots and/or memory channels to which the failed DIMM is connected. This mitigation mode allows IHS 200 to continue to boot—albeit with reduced memory. Still at 402, BIOS 207 may set the "mitigation flag" in the NVRAM.

Still at 402, IHS 200 sends notification 403 (e.g., a message, phone call, email, etc.) to remote ITDM/OEM server 102 (e.g., help desk, customer support, ITDM, etc.) indicating the memory failure. In response, at 405, depending upon the user's entitlement level, ITDM/OEM server 102 dispatches a DIMM replacement to the user (e.g., by shipping carrier). At 410, a microservice executed by ITDM/OEM server 102 also sends a request to IHS 200 to re-enter normal mode upon detection of chassis intrusion event 408.

At 404, while the new memory is in transit (e.g., from a warehouse to the user) IHS 200 operates with low memory and potential performance issues—i.e., still in mitigation mode. At 406, however, the user receives the replacement DIMM. At 407, the failed memory is replaced with the new memory, which triggers chassis intrusion event 408 (e.g., activation of a switch). In response to event 408 and request 410, at 409 method 400 returns IHS 200 to normal mode by re-booting and starting the BIOS's memory initialization processes, such that all installed DIMMs and memory channels are enabled, and the "mitigation mode" flag is cleared in the NVRAM.

In some cases, request 410 may be absent and BIOS 207 may attempt to re-enter normal mode at every chassis intrusion event detection 409. In other cases, chassis intrusion event detection 409 may be skipped and BIOS 207 may attempt to re-enter normal mode in response to request 410 alone. In yet other cases, request 410 may include one or more parameters that indicate a time window (e.g., within N days of shipment and/or delivery of the new memory) within which a chassis intrusion event should trigger the BIOS's return of IHS 200 to normal mode, such that intrusion events outside the specified window are ignored.

As such, method 400 provides an automated process for end-users, requiring no additional action on their part—other than installing the new memory inside the chassis—in order to return IHS 200 to normal mode with all available memory enumerated and utilized.

Figure 5:
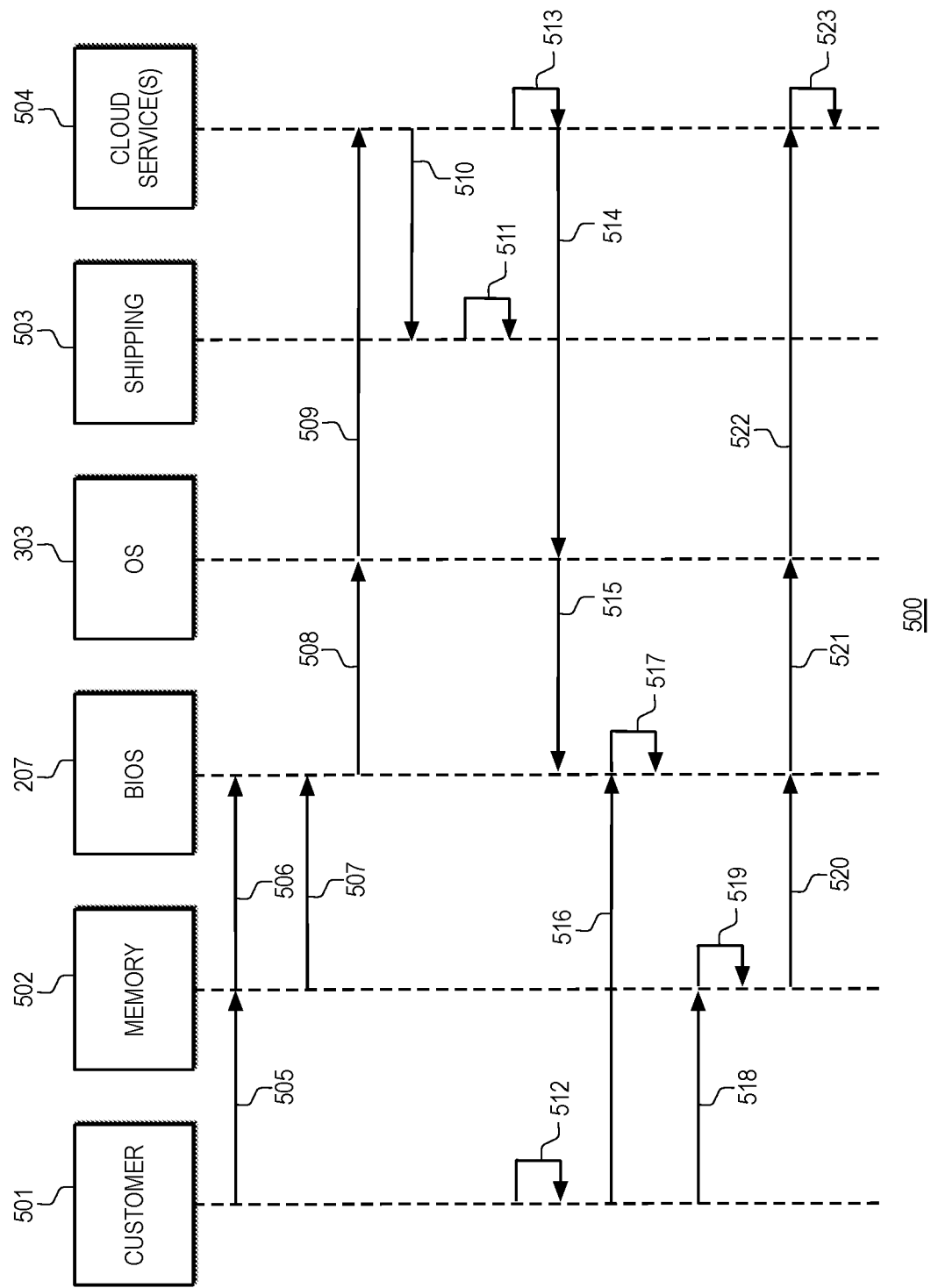
FIG. 5 is a sequence diagram illustrating an example of a method for memory serviceability mitigation, according to some embodiments.

FIG. 5 is a sequence diagram illustrating an example of method 500 for memory serviceability mitigation, according to some embodiments. At 505, customer 501 sends (or causes the sending of) a power-on or device attach command to memory device 502 (e.g., a DIMM), for example, by turning IHS 200 on. At 506, BIOS 207 detects a memory failure during its initialization and enables mitigation mode. At 507, the successful partial initialization of the otherwise failed memory 502 by BIOS 207 starts a mitigated booting process.

At 508, BIOS 207 notifies OS 303 (and/or application 304) about the memory failure. Such notification may include information such as, for example, an IHS service tag, serial number, or identification number, a DIMM part number, stock keeping unit (SKU), etc. At 509, OS 303 (and/or application 304) sends data to cloud service(s) 504 hosted by ITDM/OEM server 102.

At 510, cloud service(s) 504 notify shipping department 503, which at 511 ships the physical memory to the user. At 513, cloud service(s) 504 send or schedule the later sending of request 410. Some later time, at 512, the user receives and replaces the failed memory with the new memory (which may happen "asynchronously" with respect to other messages).

At 514, cloud service 504 sends request 410 to OS 303 (and/or application 304) to enable normal mode, and at 515 OS 303 (and/or application 304) sends a corresponding message to BIOS 207.

At 516, a chassis intrusion event originated by customer 501 is detected by BIOS 207. In response, at 517, BIOS 207 sets the NVRAM flag to enable normal mode. At 518, customer 501 (or OS 303, application 304, or BIOS 207) reboots IHS 200, at 519 memory device 502 re-enters normal mode, and at 520 BIOS 207 receives a message from memory 502 that allows it to continue its normal boot process.

At 521, BIOS 207 notifies OS 303 of the state of memory device 502, and at 522 OS 303 sends data to cloud service(s) 522 indicating the status of the remediation process. At 523 cloud service(s) 504 mark IHS 200 as having returned to normal mode. It should be noted that, in various embodiments, one or more of messages 505-523 may be followed by a corresponding acknowledgement message or response form the receiving entit(ies).

Figure 6A:
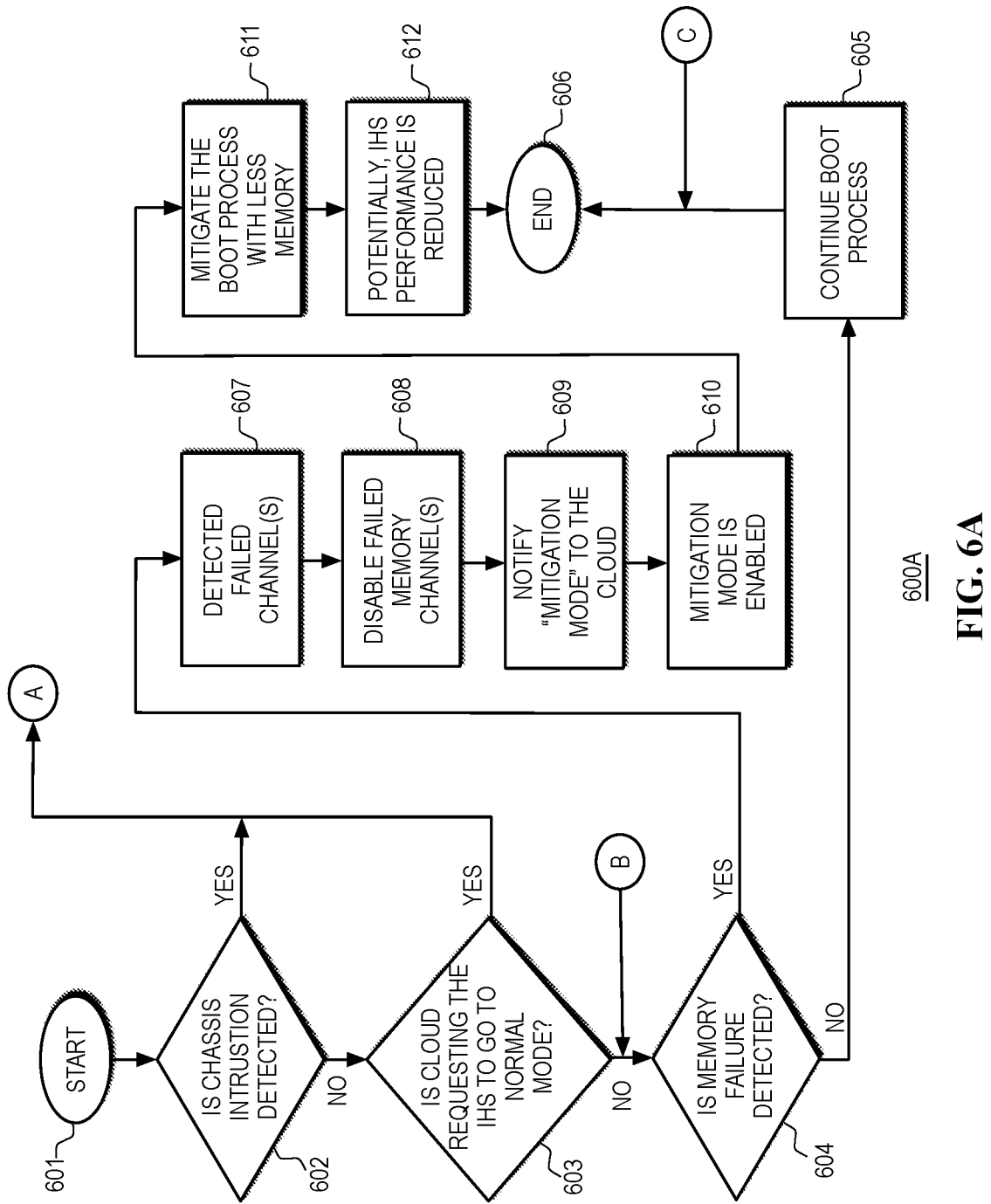
FIGS. 6A and 6B show a flowchart illustrating an example of a method for booting an IHS with memory serviceability mitigation, according to some embodiments.
Figure 6B:
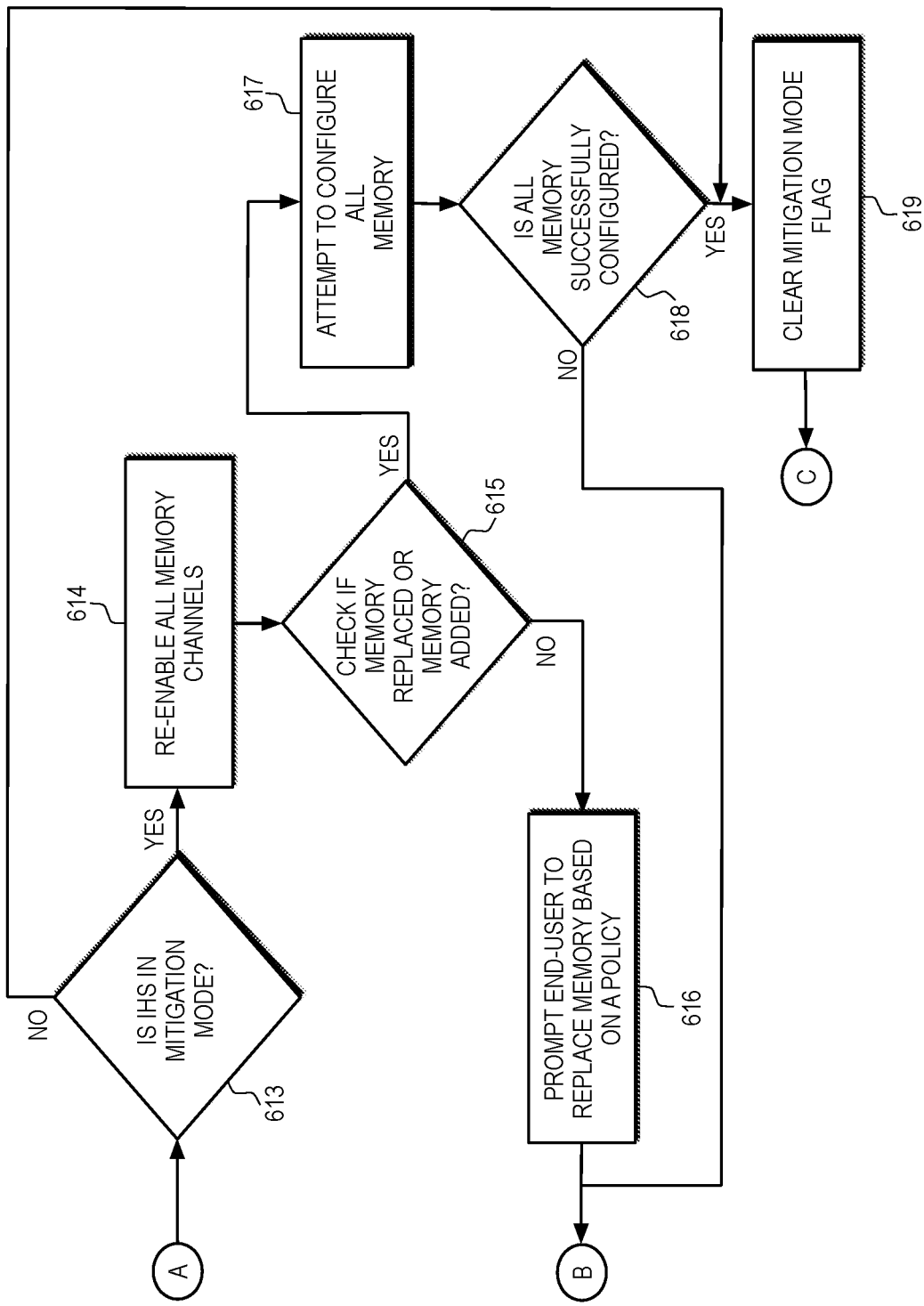

FIGS. 6A and 6B show a flowchart illustrating an example of method 600A/B for booting IHS 200 with memory serviceability mitigation, according to some embodiments. Specifically, method 600A/B starts at 601.

At 602, method 600A/B determines if a chassis intrusion event has been detected. If not, at 603, method 600A/B determines if cloud service 504 has instructed IHS 200 to return to normal mode (i.e., if request 410 has been received). If not, at 604 method 600A/B determines whether a memory failure has been detected. If not, at 605 method 600A/B continues the booting process and ends at 606.

If a memory failure is detected at 604, at 607 method 600A/B identifies the failed memory channel(s), at 608 method 600A/B disables the failed channel(s), at 609 method 600A/B notifies cloud service 504 of the IHS's entry into mitigation mode, at 610 method 600A/B enables mitigation mode, and at 611 the IHS's boot process is mitigated with less memory. As a result, at 612, the performance of IHS 200 is potentially reduced.

Returning to 603, if cloud service 504 has requested IHS 100 to go to normal mode, then at 613 method 600A/B determines if IHS 200 is in mitigation mode. If so, at 614 method 600A/B re-enables all memory channels. At 615, method 600A/B checks if memory has been replaced or added. If not, at 616 method 600A/B prompts the user to replace the failed memory (e.g., based on an IT policy). Otherwise, at 617, method 600A/B attempts to configure all memory and at 618 it determines whether all memory has been successfully configured. If not, control returns to 604. Otherwise, method 600A/B clears the mitigation mode flag at 619 and ends at 606.

Figure 7A:
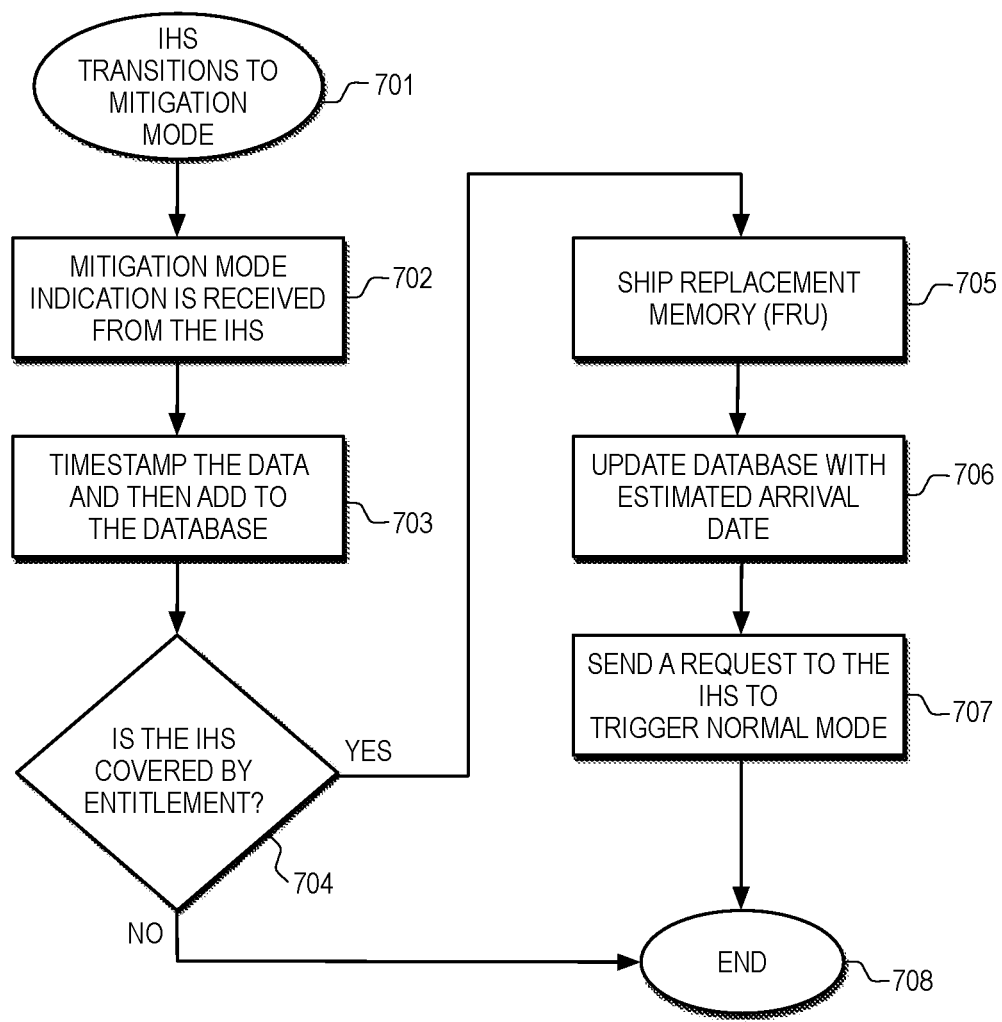
FIG. 7A-C are flowcharts illustrating examples of methods for transitioning an IHS between normal and mitigation modes of operation, from the perspective of cloud service, according to some embodiments.
Figure 7B:
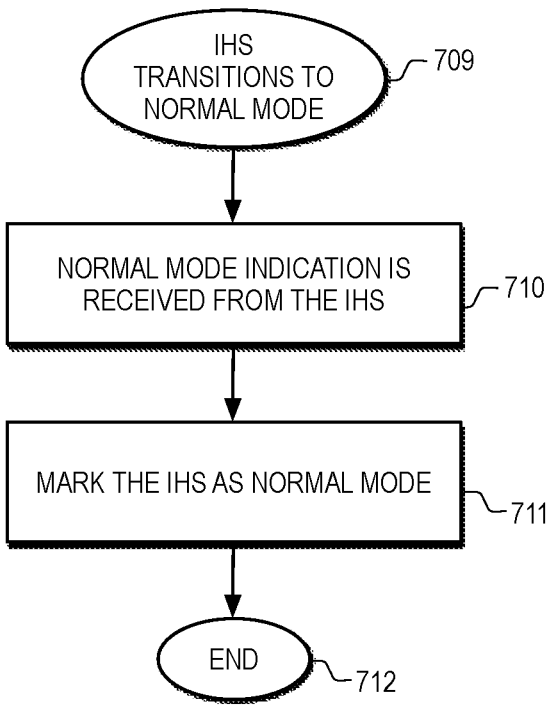
Figure 7C:
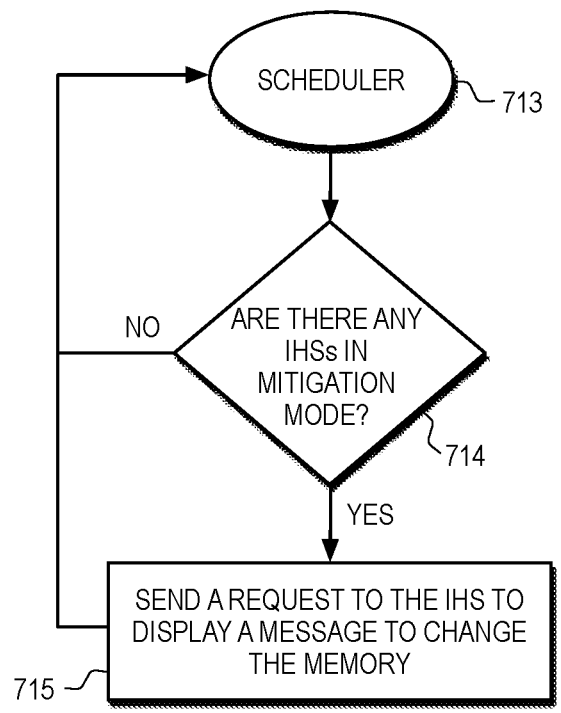

FIG. 7A-C are flowcharts illustrating examples of methods 700A-C for transitioning IHS 200 between normal and mitigation modes of operation, from the perspective of cloud service 504, according to some embodiments. In method 700A, at 701, IHS 200 transitions into mitigation mode. At 702, an indication of the mitigation mode is received from IHS 200.

At 703, the indication is timestamped and added to a table or database. At 704, method 700A determines if IHS 200 is covered by an entitlement, service, support, lease, or sales agreement. If not, method 700A ends at 708.

If IHS 200 is determined to be covered by an agreement at 704, then at 705 method 700A ships a replacement DIMM to the user. At 706, method 700A updates the table or database with a shipping date and time, as well as an estimated delivery date and time.

Before method 700A ends at 708, cloud service 504 sends request 410 to IHS 200 to trigger its normal mode of operation. In some cases, request 410 may be transmitted to IHS 200 at a date and time selected with respect to the shipping or delivery dates and times.

In method 700B, at 709 IHS 200 transitions to a normal mode. At 710, a normal mode notification is received from IHS 200. At 711, cloud service 504 marks IHS 200 as being in normal mode, and method 700B ends at 712.

In method 700C, at 713 cloud service 504 executes a scheduling application. At 714, method 700C determines if any IHSs are in mitigation mode. If not, control returns to scheduling application 713. Otherwise, at 715, method 700C sends a request to IHS 200 to produce a visual and/or audible notification to the user instructing them to replace the failed DIMM.

In sum, systems and methods for memory serviceability mitigation are described. In various embodiments, these systems and methods may facilitate the transition of an IHS back to normal mode, mode from mitigation mode, when a memory is replaced, using a cloud-managed service. Although the implementations described herein related specifically to memory devices, in other implementations the same systems and methods may be applied to other types of devices, Customer-Replaceable Units (CRUs), or Field-Replaceable Units (FRUs), that may be subject to being enabled in "mitigation mode" in response to failures, including but not limited to processors, GPUs, FPGAs, network cards, etc.

To implement various operations described herein, computer program code (i.e., program instructions for carrying out these operations) may be written in any combination of one or more programming languages, including an object-oriented programming language such as Java, Smalltalk, Python, C++, or the like, conventional procedural programming languages, such as the "C" programming language or similar programming languages, or any of machine learning software. These program instructions may also be stored in a computer readable storage medium that can direct a computer system, other programmable data processing apparatus, controller, or other device to operate in a particular manner, such that the instructions stored in the computer readable medium produce an article of manufacture including instructions which implement the operations specified in the block diagram block or blocks.

Program instructions may also be loaded onto a computer, other programmable data processing apparatus, controller, or other device to cause a series of operations to be performed on the computer, or other programmable apparatus or devices, to produce a computer implemented process such that the instructions upon execution provide processes for implementing the operations specified in the block diagram block or blocks.

Modules implemented in software for execution by various types of processors may, for instance, include one or more physical or logical blocks of computer instructions, which may, for instance, be organized as an object or procedure. Nevertheless, the executables of an identified module need not be physically located together but may include disparate instructions stored in different locations which, when joined logically together, include the module and achieve the stated purpose for the module. Indeed, a module of executable code may be a single instruction, or many instructions, and may even be distributed over several different code segments, among different programs, and across several memory devices.

Similarly, operational data may be identified and illustrated herein within modules and may be embodied in any suitable form and organized within any suitable type of data structure. Operational data may be collected as a single data set or may be distributed over different locations including over different storage devices.

Reference is made herein to "configuring" a device or a device "configured to" perform some operation(s). It should be understood that this may include selecting predefined logic blocks and logically associating them. It may also include programming computer software-based logic of a retrofit control device, wiring discrete hardware components, or a combination of thereof. Such configured devices are physically designed to perform the specified operation(s).

It should be understood that various operations described herein may be implemented in software executed by processing circuitry, hardware, or a combination thereof. The order in which each operation of a given method is performed may be changed, and various operations may be added, reordered, combined, omitted, modified, etc. It is intended that the invention(s) described herein embrace all such modifications and changes and, accordingly, the above description should be regarded in an illustrative rather than a restrictive sense.

Unless stated otherwise, terms such as "first" and "second" are used to arbitrarily distinguish between the elements such terms describe. Thus, these terms are not necessarily intended to indicate temporal or other prioritization of such elements. The terms "coupled" or "operably coupled" are defined as connected, although not necessarily directly, and not necessarily mechanically. The terms "a" and "an" are defined as one or more unless stated otherwise. The terms "comprise" (and any form of comprise, such as "comprises" and "comprising"), "have" (and any form of have, such as "has" and "having"), "include" (and any form of include, such as "includes" and "including") and "contain" (and any form of contain, such as "contains" and "containing") are open-ended linking verbs.

As a result, a system, device, or apparatus that "comprises," "has," "includes" or "contains" one or more elements possesses those one or more elements but is not limited to possessing only those one or more elements. Similarly, a method or process that "comprises," "has," "includes" or "contains" one or more operations possesses those one or more operations but is not limited to possessing only those one or more operations.

Although the invention(s) is/are described herein with reference to specific embodiments, various modifications and changes can be made without departing from the scope of the present invention(s), as set forth in the claims below. Accordingly, the specification and figures are to be regarded in an illustrative rather than a restrictive sense, and all such modifications are intended to be included within the scope of the present invention(s). Any benefits, advantages, or solutions to problems that are described herein with regard to specific embodiments are not intended to be construed as a critical, required, or essential feature or element of any or all the claims.

The invention claimed is:

1. An Information Handling System (IHS), comprising:
   a processor, and
   a memory coupled to the processor, the memory having program instructions stored thereon that, upon execution, cause the IHS to:
      after failure of a memory device, notify a cloud service of at least the memory device and enter a mitigation mode of operation with respect to the memory device;
      receive a message from the cloud service indicative of a provisioning of a replacement memory device; and
      in response to the message from the cloud service, and upon detection of a chassis intrusion event, leave the mitigation mode of operation with respect to the replacement memory device.

2. The IHS of claim 1, wherein the failure comprises a memory initialization failure during a booting process.

3. The IHS of claim 2, wherein the program instructions comprise Basic Input/Output System (BIOS) instructions.

4. The IHS of claim 1, wherein the memory device comprises a Dual In-Line Memory Module (DIMM), and wherein to enter the mitigation mode of operation, the program instructions, upon execution, further cause the IHS to disable at least a portion of a DIMM slot where the memory device is inserted.

5. The IHS of claim 1, wherein to enter the mitigation mode of operation, the program instructions, upon execution, further cause the IHS to disable fewer than all memory channels of the memory device.

6. The IHS of claim 1, wherein to enter the mitigation mode of operation, the program instructions, upon execution, further cause the IHS to set a mitigation flag in a Non-Volatile Random Access Memory (NVRAM).

7. The IHS of claim 1, wherein while in the mitigation mode of operation, the program instructions, upon execution, further cause the IHS to check a status of the mitigation flag upon boot and, if the mitigation flag is set, maintain at least portion of the memory device disabled.

8. The IHS of claim 1, wherein the message is indicative of at least one of: a warranty claim, a service agreement, a purchase, a shipment, or a delivery of the replacement memory device.

9. The IHS of claim 1, wherein the chassis intrusion event is detectable via activation of an electromechanical switch or photosensor disposed within a housing of the IHS.

10. The IHS of claim 1, wherein to leave the mitigation mode of operation, the program instructions, upon execution, further cause the IHS to initialize or enable at least a portion of the replacement memory device corresponding to at least a portion of the memory device disabled during the mitigation mode of operation.

11. The IHS of claim 1, wherein to leave the mitigation mode of operation, the program instructions, upon execution, further cause the IHS to initialize or enable at least a portion of the replacement memory device corresponding to at least a portion of the memory device disabled during the mitigation mode of operation.

12. The IHS of claim 1, wherein to leave the mitigation mode of operation, the program instructions, upon execution, further cause the IHS to clear a mitigation flag in a Non-Volatile Random Access Memory (NVRAM) in response to a successful initialization of the replacement memory module.

13. The IHS of claim 1, wherein the message comprises an indication of a time before which, in a presence of the chassis intrusion event, the IHS is configured to abstain from leaving the mitigation mode of operation.

14. The IHS of claim 1, wherein the message comprises an indication of a time at, after, or during which, in an absence of the chassis intrusion event, the IHS is configured to prompt a user to replace the memory device with the replacement memory device, and wherein the chassis intrusion event takes place in response to the prompt.

15. A memory device having program instructions stored thereon that, upon execution by a process of an Information Handling System (IHS), cause the IHS to:
   receive a notification from a client IHS indicating that the client IHS has entered a mitigation mode of operation with respect to a memory device; and
   transmit a message to the client IHS related to a replacement memory device, wherein the client IHS is configured to, in response to the message and upon detection of a chassis intrusion event, leave the mitigation mode of operation with respect to the replacement memory device.

16. The memory of claim 15, wherein the message comprises an indication of a time at, after, or during which, in a presence of the chassis intrusion event, the IHS is configured to leave the mitigation mode of operation.

17. The memory of claim 15, wherein to transmit the message, the IHS is configured to perform a warranty or service status check with respect to the client IHS.

18. A method, comprising:
   entering, upon execution of Basic Input/Output System (BIOS) instructions, a mitigation mode of operation with respect to a memory device of an Information Handling System (IHS); and
   in response to a message from a cloud service related to a replacement memory device, and upon detection of a chassis intrusion event, leaving the mitigation mode of operation with respect to the replacement memory device.

19. The method of claim 18, wherein the message comprises an indication of a time before which, in a presence of the chassis intrusion event, the IHS is configured to abstain from leaving the mitigation mode of operation.

20. The method of claim 18, wherein the message comprises an indication of a time at, after, or during which, in an absence of the chassis intrusion event, the IHS is configured to prompt a user to replace the memory device with the replacement memory device, and wherein the chassis intrusion event takes place in response to the prompt.

* * * * *